Jan. 8, 1952          C. L. CRANE          2,582,009
PREPARATION OF CELLULOSE ACETATE SULFATES
Filed July 13, 1949
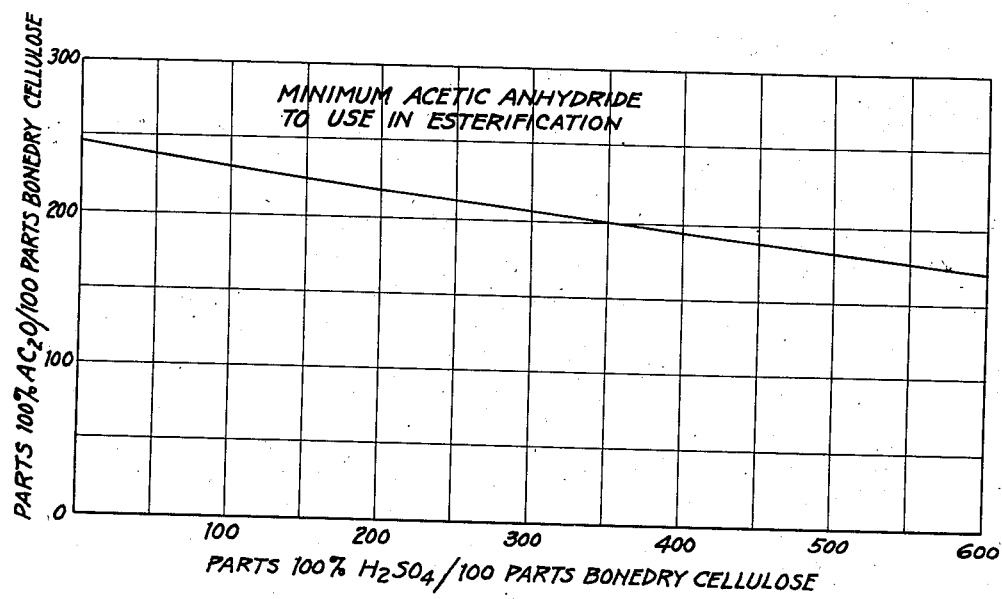
CARLTON L. CRANE
INVENTOR
BY Daniel O. Mayne
Scranton C. van Houten
ATTORNEYS Patented Jan. 8, 1952

2,582,009

UNITED STATES PATENT OFFICE 2,582,009

PREPARATION OF CELLULOSE ACETATE SULFATES

Carlton L. Crane, Rochester, N. Y., assignor to Eastman Kodak Company, Rochester, N. Y., a corporation of New Jersey Application July 13, 1949, Serial No. 104,482

9 Claims. (Cl. 260—215)

This invention relates to cellulose acetate sulfates prepared by reacting upon cellulose with a bath of acetic anhydride and sulfuric acid in which the esters formed are obtained by converting to the sodium or other salts in the esterification mass.

Previously cellulose esters have been obtained by reacting upon cellulose with acetic anhydride and a small proportion of sulfuric acid as the catalyst. The prior art generally has taught that with increased proportions of sulfuric acid the cellulose was detrimentally affected and the resulting products upon application of heat thereto were unstable. The products which have been previously prepared presented difficulties in separating the product from the reaction mixture and the methods of separating those products left much to be desired.

One object of my invention is to provide a practical method of preparing cellulose acetate sulfates having a substantial sulfur content. Another object of my invention is to provide sulfuric acid esters of cellulose which are stable in the heat tests which are used in testing cellulose derivatives. A further object of my invention is to provide a method for separating cellulose acetate sulfates from their esterification bath in which the ester formed is neutralized with a metal salt, the resulting product being insoluble in glacial acetic acid. A still further object of my invention is to provide cellulose derivatives which are soluble both in water and in various organic solvents. Other objects of my invention will appear herein.

I have found that large proportions of sulfuric acid may be employed in the preparation of cellulose esters, providing the temperature is controlled and the acetic anhydride used is in a greater proportion than necessary to supply the acetyl imparted to the cellulose in the esterification. I have found that by esterifying cellulose in baths in which 51-550 parts of sulfuric acid are employed for every 100 parts of cellulose that products are obtained having a sulfur content of 6-20% but which products exhibit good stability when those products are subjected to heat tests such as are commonly given to cellulose acetates. It has been previously supposed in the art that the presence of sulfur in cellulose acetates renders those esters unstable. Contrary to that teaching I have found that in cellulose esters prepared in accordance with my invention although substantial percentages of sulfur in the form of sulfate radicals are present, stable products are obtained.

In its broadest aspects my invention comprises esterifying cellulose with a mixture of acetic anhydride and a considerable proportion of sulfuric acid, which mixture is prepared at and held at a temperature of no more than 40° F. and controlling the temperature of the reaction so that the temperature thereof is never allowed to exceed 85° F. Thereupon a metal salt of a weak acid, such as sodium acetate, is introduced to form the salt of the cellulose acetate sulfate which was formed, which salt in the range of sulfur content of the products of my invention is insoluble in glacial acetic acid and precipitates from the esterification mass. The product thus obtained is then separated from the liquid and the liquid which contains acetic anhydride and acetic acid may be utilized for subsequent processes.

The sulfuric acid which is employed in processes in accordance with my invention is used in a proportion of 51-550 parts thereof per 100 parts of cellulose, the proportion used governing the sulfur content of the product which is obtained. The acetic anhydride which is employed is used in an amount of at least that designated by the graph of the drawing attached hereto. The straight line graphed in the accompanying drawing has substantially the formula $8Y=1930-X$ where Y is the parts of acetic anhydride per 100 parts of bone dry cellulose, and X is the parts of sulfuric acid per 100 parts of bone dry cellulose. Ordinarily 1½ times the amount of anhydride designated will not be exceeded in carrying out my process. The proportion of liquid to cellulose employed is preferably within the range of 4.8:1 to 12:1 to give satisfactory products.

As the process is carried out it is desirable that some acetic acid be present as the presence of acetic acid facilitates the separation of the salt of the cellulose acetate sulfate from solution. Ordinarily the esterification mass contains both acetic anhydride and acetic acid, each being present relative to their total in an amount of 40-60%. However, variation by the individual operator, both within and outside of these limits, is to be considered as being within the scope of my invention. Acetic acid will be present, not only as a result of its use as a diluent but, also, as a result of activation of cellulose to prepare it for the esterification and as a result of the combination of the acetic anhydride with any water which may be present in the sulfuric acid or in the cellulose. For instance, the usually available concentrated sulfuric acid is of 95% concentration, 5% being water. Some of the anhydride used is consumed in converting this water to acetic acid. The attached graph which designates the amount of acetic anhydride employed indicates the amount of acetic anhydride which should be present in the esterification mass after the water therein has been converted to acetic acid by the anhydride. Therefore, if the sulfuric acid employed is 95% concentration, the amount of acetic anhydride used should be sufficient to both destroy the water present in the mass and, also, to provide sufficient acetic anhydride to have a value of at least that shown in the attached graph.

The cellulose which is esterified in accordance with my invention is desirably pretreated by some method such as is employed at the present time for the pretreatment of cellulose prior to acetylation. The cellulose may be pretreated by pre-soaking in glacial acetic acid, followed by the addition of a solution of sulfuric acid in acetic acid thereto, or it may be pretreated by first soaking with water and replacing that water by means of glacial acetic acid. Useful methods for pretreating cellulose are those described in U. S. Patents Nos. 2,150,690 and 2,342,415 of Malm and Patent No. 2,487,892 of Richter and MacClaren.

My invention makes use of my finding that certain of the metal salts of the cellulose acetate sulfates which I prepare are insoluble in glacial acetic acid in separating those products from the esterification mass. This is accomplished by adding a metal salt of a weak acid to the completed esterification mass in sufficient amount to neutralize the sulfate ester whereupon the cellulose ester precipitates. If the glacial acetic acid content of the bath is less than 30%, it will also be desirable to add glacial acetic acid at this point, it being desirable for best results that there be at least two parts of glacial acetic acid per part of the mass. As this proportion is not usually employed in esterification, it is desirable at this point, particularly in the case of the products having a sulfur content in the lower part of the range that glacial acetic acid be added so as to have present at least enough acetic acid to constitute two-thirds of the liquid present. Some of the salts of the cellulose acetate sulfates which have exhibited insolubility in glacial acetic acid and, hence, have been separated from the reaction mass are those of Ba, Pb, Mg, Ca, Cu, Al, Na, and K. Some of the salts which are useful as an addition agent to precipitate the cellulose ester are $BaCO_3$, $Pb(OH)Ac$, $MgCO_3$, $CaCO_3$, $CuCO_3$, $AlAc$, $Na_2CO_3$, $NaAc$, $KOH$, etc., Ac being used as an abbreviation for "acetate." The potassium salt precipitates in the best manner when the cellulose ester is characterized by a high sulfur content. The product after the salt thereof is formed is easily separated from the liquid portion of the mass and is washed with some non-solvent therefor, such as isopropanol, or some other partially or completely miscible aliphatic alcohol.

It is desirable to subject the product prepared as described to a stabilizing treatment therefor. This ordinarily involves treatment such that the cellulose acetate-sulfate product takes on a permanent pH value within the range of 4.5-7. This stabilizing treatment may either be given to the product in solution in an inert solvent or while the product is in a swollen but undissolved condition.

To stabilize in dissolved condition the product is dissolved in an inert solvent therefor, water being satisfactory in the case of the sodium salt, and adjusting the pH to a value within the range of 4.5-7. This is usually accomplished by adding an alkaline material such as sodium carbonate to the solution in sufficient amount to give the desired pH, whereupon the product is precipitated and washed such as with an alcohol.

A convenient method for stabilizing the cellulose acetate-sulfate product is to form a slurry thereof in a liquid which will swell or soften the product but will not dissolve it and treat the product while in slurry form. Baths which are useful in this connection essentially consist of a water-miscible liquid such as an alcohol (i. e. an aliphatic alcohol of 1-4 carbon atoms) or acetone and water, the water being present only in an amount which will soften the cellulose acetate-sulfate product but will not dissolve it. In the case of the cellulose acetate-sulfate products of moderate or high viscosity prepared in accordance with my invention, they may be slurried in a bath consisting of 80% isopropanol and 20% water and the pH of the bath is adjusted to a value well within the range of pH 4.5-7 with an alkaline addition material such as sodium carbonate. The pH of a sample of the solid material in distilled water is also determined (solution of 0.1 g. of material in 10 cc. of water). The slurry is stirred for one hour keeping the pH of the liquid about the same, with the addition of $Na_2CO_3$ if necessary, and another pH determination is made of the solid material as before. If the pH has remained constant, the material is regarded at stable. If not, the treatment is continued until the pH of the solid material becomes constant from one time to the next. In the case of low viscosity cellulose acetate-sulfates prepared in accordance with my invention, such as those which have an intrinsic viscosity of no more than .08 sec., the water in the stabilizing bath should be used in a less proportion than with the higher viscosity esters. For instance, in some cases it is better to use 90:10 isopropanol-water or with the lowest viscosities even 92:8 isopropanol-water. Usually the cellulose acetate sulfates having a sulfur content of 9-20% require less water in their stabilizing treatment than that used in the stabilizing of the products having lower sulfur contents. In every case the water content to use is that which is sufficient to swell or soften the cellulose acetate-sulfate but is insufficient to result in its dissolution.

The following examples illustrate my invention:

*Example 1.*—250 parts of refined cotton linters containing 3% of moisture was mixed with 600 parts of glacial acetic acid in a jacketed sigma blade mixer (Werner-Pfleiderer) for one hour at 100° F. A mixture of two parts of 95% sulfuric acid and 330 parts of glacial acetic acid was added to the mixer and the temperature of the bath was reduced to 65° F. 50 parts of 97% acetic anhydride was added to the mixture and agitation was continued for fifteen minutes while reducing the temperature to 50° F. 640 parts of 97% acetic anhydride was mixed with 690 parts of glacial acetic acid and cooled to below 40° F. 451 parts of anhydrous sulfuric acid was slowly stirred into the acetic acid-acetic anhydride mixture while maintaining its temperature below 40° F. When the mixing was completed, the solution was chilled to 14° F. and was slowly and uniformly added to the mass in the mixer over a period of fifteen minutes. Brine having a temperature of 13° F. was circulated in the jacket of the mixer during the addition and the reaction temperature was held at 50° F. When the addition was complete, the temperature was kept at 50° F. over fifteen minutes and then allowed to rise to 65° F. After 4½ hours reaction time the mass was uniform. The jacket temperature was reduced to 14° F. and 450 parts of anhydrous technical sodium acetate was added in four equal parts at fifteen-minute intervals. When the neutralization was complete, the slurry was held one hour at approximately 60° F. The mass was centrifuged and the white granular product obtained was washed in six one-hour washes of isopropanol and was stabilized by first slurrying in 80:20 isopropanol water, imparting an apparent pH of about 6 to the liquid by the careful addition of sodium carbonate thereto, and stirring at this pH until the material showed a constant pH in solution in distilled water (0.1 g. in 10 cc. water) in a succession of tests. After washing the product was dried at 140° F. and upon analysis was found to have a sulfur content of 13.1% and an acetyl content of 15.7%. The intrinsic viscosity in distilled water was 0.41. Both the sodium salt and the acid salt were water-soluble.

Example 2.—250 parts of refined cotton linters were placed in a jacketed sigma blade type mixer and mixed with 600 parts of glacial acetic acid for one hour at 100° F. A mixture of 350 parts of acetic acid and 1.84 parts of concentrated sulfuric acid were then added to the mixer and the mixture was cooled to 65° F. over one-half hour.

Separately 690 parts of acetic acid were mixed with 690 parts of 97% acetic anhydride and cooled to a temperature less than 40° F. 149 parts of cooled, concentrated sulfuric acid (95%) was added to the acetice acid-anhydride mixture at such a rate that the temperature did not exceed 40° F. This solution was then cooled to 16° F. and uniformly added to the mass in the mixer over a period of fifteen minutes. The reaction temperature of the mass was maintained at 65–68° F. during this addition and was gradually reduced to 58° F. over one-half hour. The temperature of the mass was then allowed to rise to 63° F. over 2½ hours.

150 parts of solid sodium acetate was added to the reaction mass in four equal portions at ten minute intervals. The jacket of the mixer was cooled during the addition to maintain the reaction temperature below 70° F. When the neutralization was complete, 3600 parts of glacial acetic acid was added and the mass was stirred one hour at 60° F. until precipitation was complete. The product was then drained on a Buchner funnel and washed in six changes of isopropanol until free from acid. The product was then stabilized by first slurrying in 80:20 isopropanol water, imparting to the liquid an apparent pH of about 6 by the careful addition of sodium carbonate thereto and stirring at this pH until samples of the material showed a constant pH in solution in distilled water (0.1 g. in 10 cc. water) in a succession of tests. After washing the granular white product was dried at 140° F. and upon analysis was found to have a sulfur content of 7.9% and an acetyl content of 25.5% and to be soluble in acetone-water (1:1) and in distilled water. The viscosity of a 5% solution in distilled water was 29,700 cps.

Example 3.—300 parts of refined cotton linters was mixed with 900 parts of glacial acetic acid in a jacketed sigma blade type mixer for one hour at 100° F. A mixture of 2.76 parts of concentrated sulfuric acid and 100 parts of acetic acid was then added, and the mixture was cooled to 65° F.

Separately 825 parts of 97% acetic anhydride and 515 parts of acetic acid were mixed and cooled to below 40° F. 542 parts of cooled sulfuric acid (95% strength) were added to this acetic acid-anhydride mixture with sufficient cooling that the temperature never exceeded 40° F. The mixture was further cooled to 30° F. and slowly and uniformly added to the mass in the mixer over a fifteen-minute period maintaining the reaction temperature at 62–66° F. during the addition. The reaction temperature was gradually reduced to 56° F. over thirty minutes and then allowed to rise to 64° F. over 3¾ hours.

There was then added to the mixture 550 parts of sodium acetate in four equal parts at ten minute intervals. The reaction temperature rose from 64° F. to 85° F. during these additions. The cellulose derivative was thereby precipitated and was drained and washed free of acid with six changes of isopropanol. The product was then stabilized by first slurrying in 90:10 isopropanol water, imparting to the liquid an apparent pH of about 6 by the careful addition of sodium carbonate thereto and stirring at this pH until samples of the material showed a constant pH in solution in distilled water (0.1 g. in 10 cc. water) in a succession of tests. After washing the product was dried at 140° F. The dry ester had an acetyl content of 9.3% and a sulfur content of 13.4%.

Example 4.—250 parts of refined cotton linters containing 4.3% moisture were pre-soaked with 600 parts of glacial acetic acid for one hour at 100° F. A mixture of 1.84 parts of sulfuric acid (95% strength) and 180 parts of glacial acetic acid was added to the bath, and the temperature of the mixture was cooled to 65° F. over a period of fifteen minutes. 70 parts of 97% acetic anhydride was added and stirred in for fifteen minutes with the jacket temperature at 18° F.

830 parts of 97% acetic anhydride was separated mixed with 620 parts of acetic acid and cooled to below 40° F. 1380 parts of sulfuric acid (95% strength) were slowly added to the acetic acid-anhydride mixture with stirring, the temperature being held below 36° F. When the mixing was complete, the mixture was cooled to 19° F. and was uniformly added to the cellulose mass in the mixer over a period of thirty minutes. The temperature of the reaction was held at approximately 60° F. during this addition. The reaction temperature was then allowed to rise to 72° F. over a period of one hour. When the reaction was complete, the jacket temperature was reduced to 18° F. and 1230 parts of technical anhydrous sodium acetate was added to the mass in five equal parts at ten minute intervals. The bath temperature rose to a maximum of 86° F. during the addition, and the cellulose ester was thereby completely precipitated from the esterification bath. The precipitate was drained and washed in four two-hour changes of isopropanol. When washing was complete, the product was stabilized by re-dissolving in 1500 parts of distilled water, filtering, and adjusting the pH to 6 with sodium carbonate. The solution was then precipitated in isopropanol, washed three times in isopropanol, and dried at 140° F. The product obtained had an apparent sulfur content of 20.7% and an acetyl content of 1.8%.

I claim:

1. A method of preparing cellulose acetate sulfates which comprises esterifying cellulose in an esterification bath made up essentially of 51–550 parts of $H_2SO_4$ and acetic anhydride the parts of 100% acetic anhydride per 100 parts of bone dry cellulose being at least $$\frac{1930-X}{8}$$

where X equals the parts of 100% sulfuric acid per 100 parts of bone dry cellulose, the liquid-to-cellulose ratio being 4.8–12:1, at a temperature not to exceed 85° F., adjusting the liquid composition of the bath so that at least 2/3 of the completed esterification bath is glacial acetic acid and then adding thereto a metal salt which converts the cellulose ester therein to a salt insoluble in glacial acetic acid whereby the cellulose derivative separtes from the liquid portion of the mass.

2. A method of preparing cellulose acetate sulfates which comprises esterifying cellulose in an esterification bath made up esseintially of 51–550 parts of $H_2SO_4$ and acetic anhydride the parts of 100% acetic anhydride per 100 parts of bone dry cellulose being at least $$\frac{1930-X}{8}$$

where X equals the parts of 100% sulfuric acid per 100 parts of bone dry cellulose, the liquid-to-cellulose ratio being 4.8–12:1, at a temperature not to exceed 85° F., adjusting the liquid composition of the bath so that at least 2/3 of the completed esterification bath is glacial acetic acid and then adding thereto a sodium salt which converts the cellulose ester therein to a salt insoluble in glacial acetic acid whereby the cellulose derivative separates from the liquid portion of the mass.

3. A method of preparing cellulose acetate sulfates which comprises esterifying cellulose in an esterification bath made up essentially of 51–550 parts of $H_2SO_4$, acetic acid and acetic anhydride, the parts of 100% acetic anhydride per 100 parts of bone dry cellulose being at least $$\frac{1930-X}{8}$$

where X equals the parts of 100% sulfuric acid per 100 parts of bone dry cellulose, the acetic anhydride and acetic acid in the esterification bath each being 40–60% of their total, the liquid-to-cellulose ratio being 4.8–12:1, at a temperature not to exceed 85° F., adjusting the liquid composition of the bath so that at least 2/3 of the completed esterification bath is glacial acetic acid and then adding thereto a metal salt which converts the cellulose ester therein to a salt insoluble in glacial acetic acid whereby the cellulose derivative separates from the liquid portion of the mass.

4. A method of preparing cellulose acetate sulfates which comprises esterifying cellulose in an esterification bath made up essentially of 51–550 parts of $H_2SO_4$ and acetic anhydride the parts of 100% acetic anhydride per 100 parts of bone dry cellulose being at least $$\frac{1930-X}{8}$$

where X equals the parts of 100% sulfuric acid per 100 parts of bone dry cellulose, the liquid-to-cellulose ratio being 4.8–12:1, at a temperature not to exceed 85° F., adjusting the liquid composition of the bath so that at least 2/3 of the completed esterification bath is glacial acetic acid and then adding thereto a metal salt which converts the cellulose ester therein to a salt insoluble in glacial acetic acid whereby the cellulose derivative separates from the liquid portion of the mass and stabilizing the cellulose acetate sulfate formed by adjusting the pH thereof to within the range of 4.5–7.

5. A method of preparing cellulose acetate sulfates which comprises esterifying cellulose in an esterification bath made up essentially of 51–550 parts of $H_2SO_4$ and acetic anhydride the parts of 100% acetic anhydride per 100 parts of bone dry cellulose being at least $$\frac{1930-X}{8}$$

where X equals the parts of 100% sulfuric acid per 100 parts of bone dry cellulose, the liquid-to-cellulose ratio being 4.8–12:1, at a temperature not to exceed 85° F., adjusting the liquid composition of the bath so that at least 2/3 of the completed esterification bath is glacial acetic acid and then adding thereto a metal salt which converts the cellulose ester therein to a salt insoluble in glacial acetic acid whereby the cellulose derivative separates from the liquid portion of the mass and stabilizing by dissolving the cellulose acetate sulfate formed in a solvent therefor and adjusting the pH to 4.5–7.

6. A method of preparing cellulose acetate sulfates which comprises esterifying cellulose in an esterification bath made up essentially of 51–550 parts of $H_2SO_4$ and acetic anhydride the parts of 100% acetic anhydride per 100 parts of bone dry cellulose being at least $$\frac{1930-X}{8}$$

where X equals the parts of 100% sulfuric acid per 100 parts of bone dry cellulose, the liquid-to-cellulose ratio being 4.8–12:1, at a temperature not to exceed 85° F., adjusting the liquid composition of the bath so that at least 2/3 of the completed esterification bath is glacial acetic acid and then adding thereto a metal salt which converts the cellulose ester therein to a salt insoluble in glacial acetic acid whereby the cellulose derivative separates from the liquid portion of the mass and stabilizing by submerging the cellulose acetate sulfate formed in a liquid which swells but does not dissolve it and adjusting the pH of the ester in distilled water to a range of 4.5–7.

7. A method of preparing cellulose acetate sulfates which comprises esterifying cellulose in an esterification bath made up essentially of 51–550 parts of $H_2SO_4$ and acetic anhydride the parts of 100% acetic anhydride per 100 parts of bone dry cellulose being at least $$\frac{1930-X}{8}$$

where X equals the parts of 100% sulfuric acid per 100 parts of bone dry cellulose, the liquid-to-cellulose ratio being 4.8–12:1, at a temperature not to exceed 85% F., adjusting the liquid composition of the bath so that at least 2/3 of the completed esterification bath is glacial acetic acid and then adding thereto a sodium salt which converts the cellulose ester therein to a salt insoluble in glacial acetic acid whereby the cellulose derivative separates from the liquid portion of the mass and stabilizing the cellulose acetate sulfate formed by adjusting the pH thereof to within the range of 4.5–7.

8. A method of preparing cellulose acetate sulfates which comprises esterifying cellulose in an esterification bath made up essentially of 51–550 parts of $H_2SO_4$ and acetic anhydride the parts of 100% acetic anhydride per 100 parts of bone dry cellulose being at least $$\frac{1930-X}{8}$$

where X equals the parts of 100% sulfuric acid per 100 parts of bone dry cellulose, the liquid-to-cellulose ratio being 4.8–12:1, at a temperature not to exceed 85° F., adjusting the liquid composition of the bath so that at least ⅔ of the completed esterification bath is glacial acetic acid and then adding thereto a sodium salt which converts the cellulose ester therein to a salt insoluble in glacial acetic acid whereby the cellulose derivative separates from the liquid portion of the mass and stabilizing by dissolving the cellulose acetate sulfate formed in a solvent therefor and adjusting the pH to 4.5–7.

9. A method of preparing cellulose acetate sulfates which comprises esterifying cellulose in an esterification bath made up essentially of 51–550 parts of $H_2SO_4$ and acetic anhydride the parts of 100% acetic anhydride per 100 parts of bone dry cellulose being at least $$\frac{1930-X}{8}$$

where X equals the parts of 100% sulfuric acid per 100 parts of bone dry cellulose, the liquid-to-cellulose ratio being 4.8–12:1, at a temperature not to exceed 85° F., adjusting the liquid composition of the bath so that at least ⅔ of the completed esterification bath is glacial acetic acid and then adding thereto a sodium salt which converts the cellulose ester therein to a salt insoluble in glacial acetic acid whereby the cellulose derivative separates from the liquid portion of the mass and stabilizing by submerging the cellulose acetate sulfate formed in a liquid which swells but does not dissolve it and adjusting the pH of the ester in distilled water to a range of 4.5–7.

CARLTON L. CRANE.

REFERENCES CITED

The following references are of record in the file of this patent:

UNITED STATES PATENTS

| Number | Name | Date |
|---|---|---|
| 1,866,532 | Haskins | July 12, 1932 |
| 2,033,787 | Rigby | Mar. 10, 1936 |

OTHER REFERENCES

Ott: "Cellulose and Cellulose Derivatives," 1943, page 675.